United States Patent [19]
Songer

[11] Patent Number: 5,621,276
[45] Date of Patent: Apr. 15, 1997

[54] CATHODE RAY TUBE

[75] Inventor: Jimmie D. Songer, Burleson, Tex.

[73] Assignee: Magma, Inc., Fort Worth, Tex.

[21] Appl. No.: 433,867

[22] Filed: May 1, 1995

Related U.S. Application Data

[63] Continuation-in-part of Ser. No. 877,821, May 1, 1992, abandoned.

[51] Int. Cl.⁶ .......................... H01J 29/46; H01J 29/56
[52] U.S. Cl. .......................................... 315/14; 313/409
[58] Field of Search ............................ 315/14, 374, 375; 313/409, 414, 413

[56] References Cited

U.S. PATENT DOCUMENTS

| | | |
|---|---|---|
| 3,363,129 | 1/1968 | De France et al. . |
| 3,439,207 | 4/1969 | Barten . |
| 3,500,114 | 3/1970 | Sawai . |
| 3,505,464 | 4/1970 | Clingman, Jr. et al. . |
| 3,511,924 | 5/1970 | Goode . |
| 3,636,129 | 1/1972 | De France et al. . |
| 3,921,025 | 11/1975 | Odenthal ................... 313/434 |
| 3,975,766 | 8/1976 | Sano et al. . |
| 4,137,485 | 1/1979 | Van Raalte ............... 315/366 |
| 4,931,786 | 6/1990 | Selby, III . |
| 4,939,413 | 7/1990 | Tomii et al. .............. 315/366 |
| 4,954,901 | 9/1990 | Okada et al. ............. 358/242 |
| 5,068,579 | 11/1991 | Tomii et al. .............. 315/366 |
| 5,350,978 | 9/1994 | Chen ..................... 315/368.15 |
| 5,382,883 | 1/1995 | Chen et al. ............ 315/368.15 |
| 5,389,855 | 2/1995 | Chen ......................... 314/14 |
| 5,483,128 | 1/1996 | Chen ......................... 315/382 |

*Primary Examiner*—Theodore M. Blum
*Attorney, Agent, or Firm*—David Newman Associates, P.C.

[57] ABSTRACT

A cathode ray tube suitable for use as a visual display includes two or more electron guns. The beams from the electron guns are aligned vertically so that a single horizontal scan of the guns produces two rows of pixels on the front face of the tube. This allows twice as much data to be painted on the display screen without increasing the scan rate of the electron guns. Each of the guns may be a single beam gun, for monochrome displays, or each may be a triple-element gun for RGB displays.

23 Claims, 4 Drawing Sheets

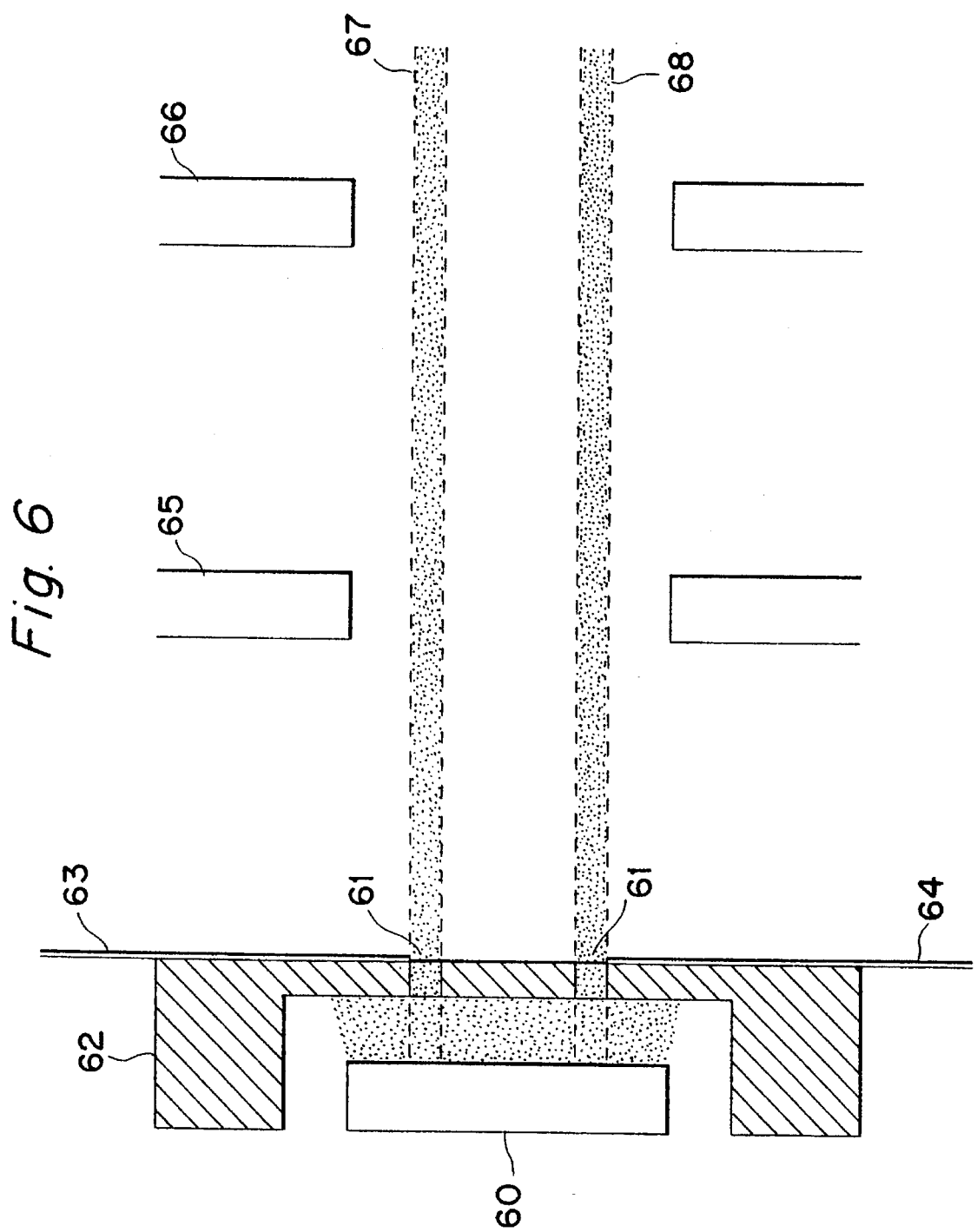

CATHODE RAY TUBE

This patent issued from a file wrapper continuation-in-part application of a patent application entitled, CATHODE RAY TUBE, having serial number 07/877,821 and filing date May 1, 1992, now abandoned. The benefit of the earlier filing date of the parent patent application is claimed pursuant to 35 U.S.C. §120.

BACKGROUND OF THE INVENTION

1. Field of the Invention

The present invention relates generally to video displays, and more specifically to a design for a cathode ray tube.

2. Description of the Prior Art

Since the inception of television, work has been performed on a nearly constant basis to improve the quality of the displayed image. In recent years, much attention has been directed to efforts to put more information, i.e. an increased number of pixels, onto the screen. This is especially true with respect to high definition television (HDTV), and computer system graphics displays.

In order to increase the number of pixels contained in a raster display, such as a television or a computer monitor, it is necessary to increase the number of scan lines and the number of pixels-width displayed on each line. Since the screen refresh rate remains fixed for television displays, and must be kept high enough to avoid flicker on computer displays, it is necessary to provide faster scanning speeds for the electron gun used to paint the raster display. For color displays, the three grouped RGB guns are subject to the same requirements. Faster scanning speeds for the electron gun reduces the time available for the gun to paint each pixel in the display.

An increased scanning rate, in turn, decreases the brightness of the image. This decrease in brightness can be compensated to some degree by increasing the voltage used to drive the electron guns. Higher voltage increases the energy of the electron beam at the phosphor, causing it to glow more brightly. However, the electron beam energy cannot simply be increased without limit. Increasing the energy has several drawbacks, including blooming effects of the scans, and increased diameter of the beam.

Another approach to increasing display brightness requires utilization of brighter phosphors on the screen. This approach also has limits, in that the brightness of the phosphors cannot be increased arbitrarily and without limits. In addition, brighter phosphors tend to be significantly more expensive.

Brightness limits caused by high scanning rates have adversely impacted the development of technologies such as high definition television. It is well known that current technologies for displaying HDTV signals generally suffer from a dramatic decrease in image brightness. Specialty, high-density computer-graphics monitors suffer from a similar scan-rate problem.

It would be desirable to provide a display tube for use with television or other information displays which provides high brightness levels combined with high information density. It would further be desirable for such a display to be easily manufacturable at a relatively low cost.

SUMMARY OF THE INVENTION

Therefore, in accordance with the present invention, a cathode ray tube suitable for use as a visual display includes two or more electron guns. Alternatively, a split-beam gun may be used in lieu of double guns. The beams from the electron guns or the split-beam gun are aligned vertically so that a single horizontal scan of the guns or the split-beam sun produces two rows of pixels on the front face of the tube. This allows twice as much data to be painted on the display screen without increasing the scan rate. Each of the guns may be a single beam gun, for monochrome displays, or each may be a triple-element gun for RGB displays.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

FIG. 6 is an illustration of a split-beam gun according to the present invention.

DESCRIPTION OF THE PREFERRED EMBODIMENT

Figure 1:
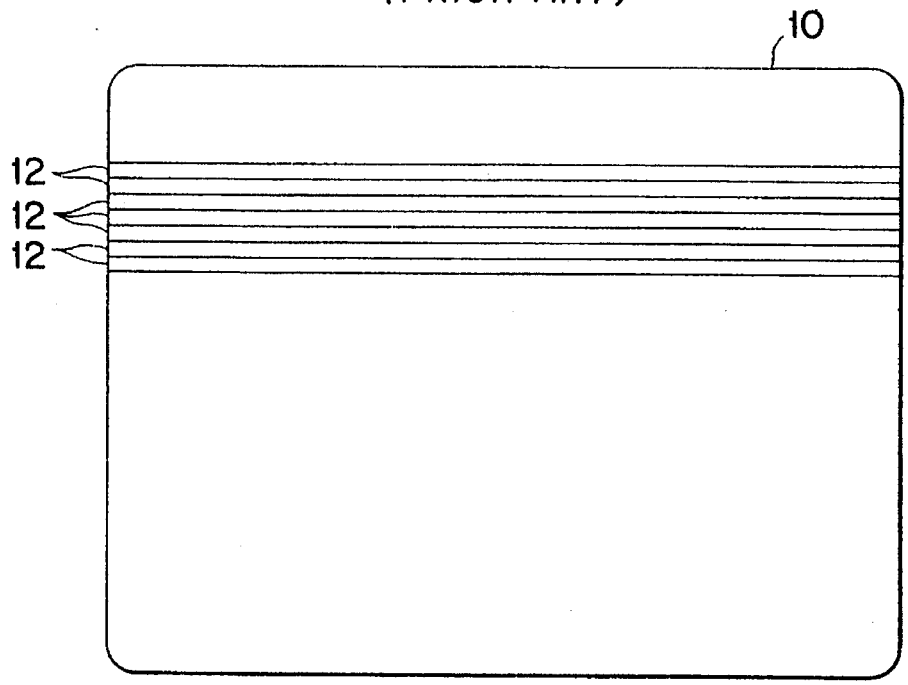
FIG. 1 is a diagram showing a portion of a raster display according to the prior art.

Reference now is made in detail to the present preferred embodiments of the invention, examples of which are illustrated in the accompanying drawings, wherein like reference numerals indicate like elements throughout the several views.

As is well known, raster displays are used for the display of television signals and most computer system graphics applications. FIG. 1 illustrates a portion of a front of a cathode ray tube used for raster displays according to the prior art. The cathode ray tube has a front screen 10 which contains phosphors suitable for displaying information in response to being painted from behind by a beam of electrons generated by an electron gun. A few rows 12 of the display as presented on the screen 10 are illustrated in FIG. 1. Information is drawn on the screen 10 by scanning the electron beam horizontally to produce the rows 12. As is well known in the art, increasing the number of rows 12 displayed on the screen 10 requires increasing the scanning rate of the electron beam. For example, if it is desired to double the number of rows 12 displayed on the screen, the scanning rate of the electron beam must be approximately doubled in order to paint a single screen 10 in the same length of time. This dramatically decreases the brightness of the displayed image. If the scan rate remains the same, the number of pixels in the image is reduced.

Figure 2:
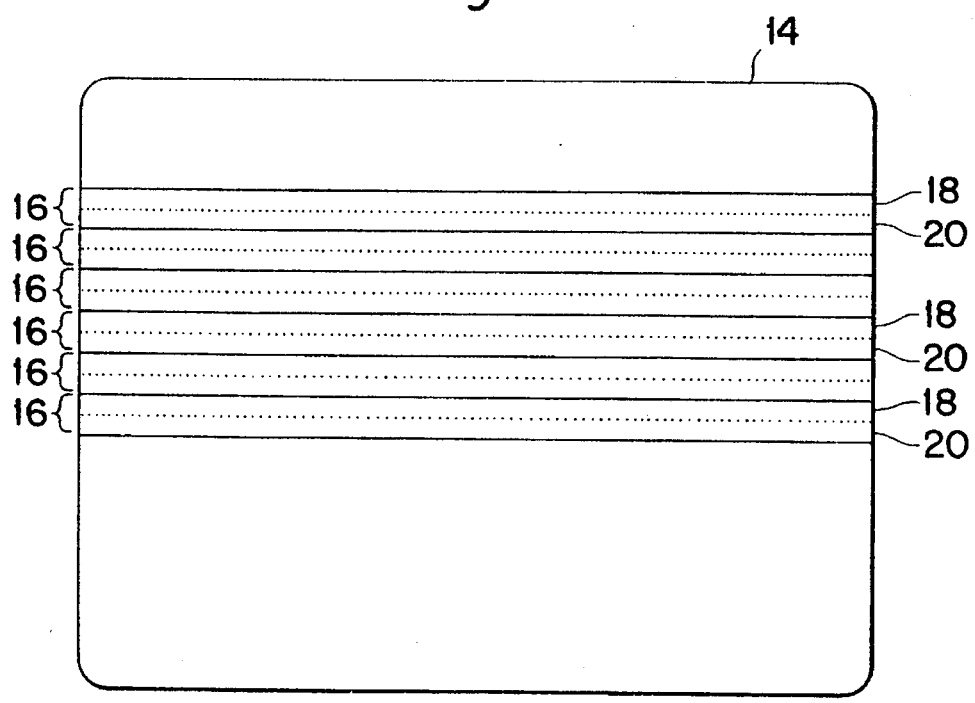
FIG. 2 is a diagram illustrating a raster display according to the principles of the present invention.

FIG. 2 also depicts a screen 14 containing phosphors which glow in response to being painted from behind by an electron beam. In accordance with the present invention, two electron beams are used to simultaneously paint rows on the screen 14. As shown in FIG. 2, the raster is shown to be considered as being made up of row pairs 16. Each row pair 16 has an upper row 18 and a lower row 20. These are painted simultaneously by providing two independent electron beams, one above the other, which scan the width of the screen 14 together. One electron gun paints the upper rows 18, while the other paints the lower rows 20. Since each electron gun is independently driven, the data for the upper rows 18 can be different from that for the lower rows 20. Thus, in a single sweep of the guns across the screen, two rows of pixels have been painted. This is accomplished without increasing the scan rate of either electron gun, so that brightness of the display as presented on the screen 14 is not diminished.

Figure 3:
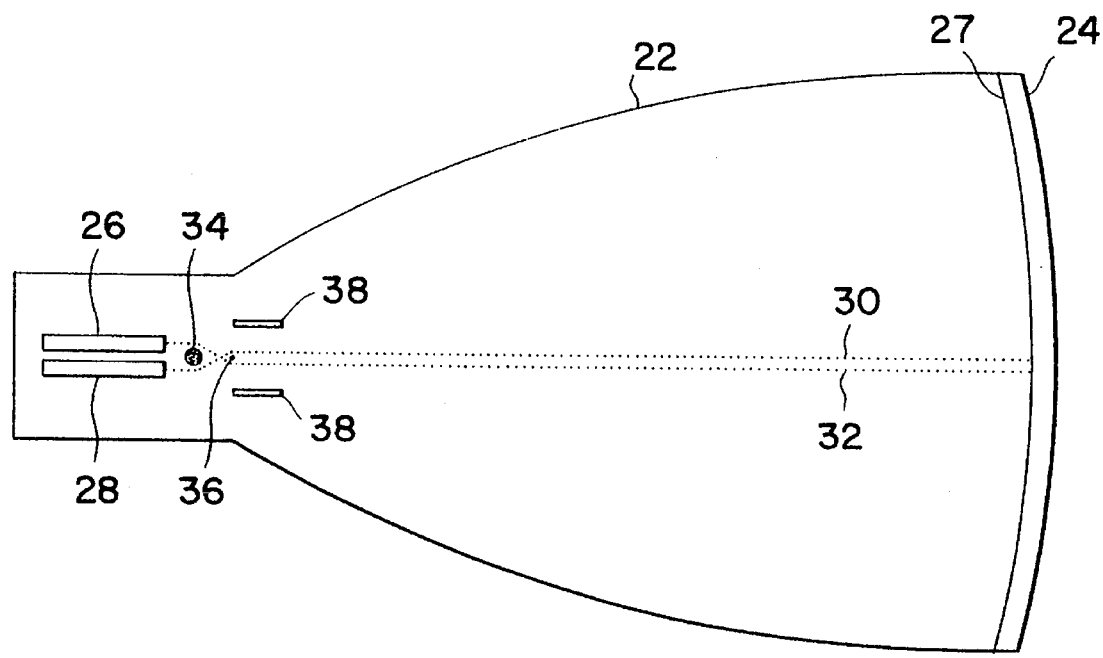
FIG. 3 is a cross section of a cathode ray tube according to the present invention.

FIG. 3 shows a cross section of a cathode ray tube suitable for implementing the concept described above. The cathode ray tube 22 has a phosphor screen 24 as known in the art. Impact of electrons against the phosphor screen 24 cause the phosphor screen to glow. In addition, as known in the art, a shadow mask 27 is spaced slightly behind the phosphor screen 24, and used to direct red, green and blue (RGB) electron guns to the correct phosphor dots in order to properly display colors.

In the rear portion of the cathode ray tube 22, two electron guns 26, 28 are provided, each of which provide a single electron beam. Upper electron gun 26 contains RGB elements so that it actually provides three electron sub-beams that comprise the single beam emitted by electron gun 26. Electron gun 26, by itself, is the same kind of electron gun typically found in a standard color television set or monitor.

Lower electron gun 28 is identical to electron gun 26 and is placed below the upper electron gun 26. Preferably, upper and lower electron guns 26, 28 are aligned vertically, so that the beams which they emit are in pixel registration with each other. The electron guns 26 and 28 may be offset horizontally so that the electron beams do not actually cross, as described below.

Upper electron beam 30 is emitted by the lower electron gun 28, and is used to paint the upper row 18 of each row pair 16. Lower electron beam 32 is emitted by the upper electron gun 26 and produces the lower row 20 of each row pair 16.

Figure 4:
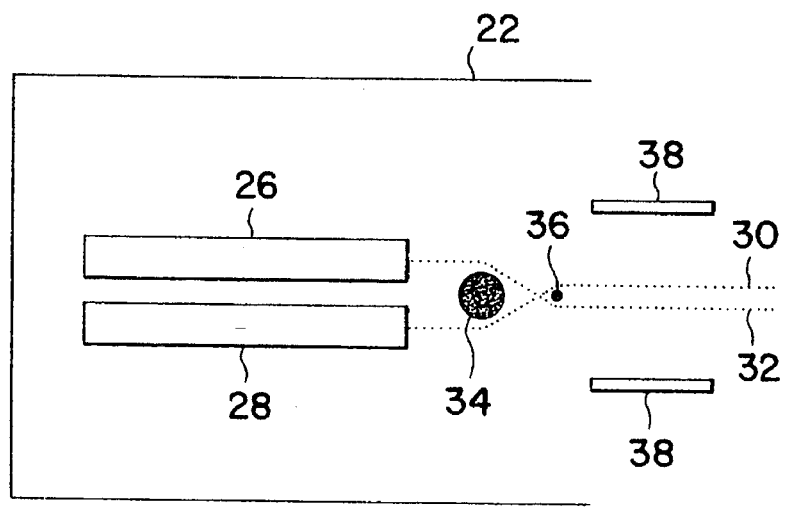
FIG. 4 is an enlargement of a portion of the tube illustrated in FIG. 3.

Two anodes 34, 36 are used to properly align the upper and lower electron beams 30, 32. Since the electron guns 26, 28 will, in general, have a vertical spacing larger than the required distance between the electron beams 30, 32, it is necessary to bring these electron beams closer together. A preferred technique for doing this involves redirecting the electron beams with the alignment anode 34 to cause the electron beams to converge. Immediately after the electron beams converge, the electron beams pass into the field generated by the correction anode 36, which bends the two electron beams until the electron beams are precisely parallel. From the correction anode 36 to the point of impact on the phosphor screen 24, the electron beams 30, 32 are precisely parallel and spaced one scan line distance apart. It will be apparent to those skilled in the art that various techniques can be used to provide proper convergence of electron beams 30, 32. For example, the electron beam emitted by the upper electron gun 26 may become the upper electron beam 30 with the electron beam paths never appearing to cross in the vertical plane as shown in FIG. 3 and FIG. 4.

Vertical deflection plates 38 deflect the two electron beams 30, 32 in a vertical direction. Horizontal deflection plates, or a magnetic deflection system, (not shown) are used to sweep the electron beams in a horizontal direction. As is well known in the art, the use of these vertical and horizontal deflection plates allows the raster to be painted on the phosphor screen 24. Since two electron beams 30, 32 are provided by this cathode ray tube 22, two rows of pixels will be painted for each horizontal scan.

Most of the technology used to form the improved cathode ray tube 22 is the same as that currently used in the art. For example, the horizontal and vertical deflection plate are very much the same, with possible size variations due to the fact that two lines are being scanned at once. The shadow mask 27 and phosphorus screen 24 are the same as those which would be used in a display tube having a single electron gun, but being able to display a large number of lines. Each of the electron guns 26, 28 is fabricated using known designs. The anodes 34, 36 are new, but their operation to deflect and align electron beams uses the same principles as those which are used to build all cathode ray tubes.

The improved cathode ray tube 22 can be used in several different ways. First, both the upper and lower electron guns 26, 28 can be driven with the same signal, which causes the cathode ray tube to paint two identical rows of pixels on the phosphor screen 24. Thus, the improved tube 22 could be connected to a standard video signal, such as the NTSC signal used for television in the United States or the PAL or SECAM used in other parts of the world. Painting the same line of information twice simply results in a brighter image. If desired, two parallel rows can actually be scanned with the same data, or the beams 30, 32 can be focused by the correction anode 36 to actually impact the same phosphor dots. This would simply increase the brightness of the phosphor by directing more energy to it, without blooming phenomena or span-size increase. Also, one set of electron guns could be switched off so that the cathode ray tube would be compatible with a present-day system.

The cathode ray tube 22 can also be used for high definition television signals by displaying two lines at once. A large number of techniques can be used to drive the cathode ray tube 22 in this manner. As one simple example, the first scan line received by a television set is delayed using an electronic delay circuit until the second scan line is received. Then the first line is used to drive the lower electron gun 28, with the second line being used to drive the upper electron gun 26 simultaneously. Since the first and second scan lines are being painted simultaneously, the horizontal deflection rate is one-half that which would be required if only a single electron gun were provided. By the time the first and second scan lines have been painted, the third and fourth scan lines will be available, and can be used to drive the electron guns 26, 28 as just described. In this manner, high definition television signals can be painted on a cathode ray tube using current technology to achieve currently available NTSC brightness levels.

It will be apparent to those skilled in the art that numerous other techniques can be used to provide appropriate signals to the tube 22. For example, two channels of data can be provided simultaneously, so that each electron gun 26, 28 simply paints all the lines of its own field as the data is received. Alternatively, one electron gun can be used for a single channel of information while the other electron gun is used for interpolated data from the single channel. In order to double the vertical resolution of the display as presented on the screen it is only necessary to provide the necessary information to the two electron guns 26, 28.

This same technique is used to display high density graphics displays. The odd numbered display lines are electronically delayed so that the odd numbered display lines are presented to one electron gun at the same time as the following even numbered display line is presented to another electron gun. This allows for the display of two lines of information independently, while maintaining the slower horizontal scan speed desired to provide reasonable brightness levels.

Although a cathode ray tube 22 having two electron guns 26, 28 has been shown in FIG. 3, it will be apparent to those skilled in the art that additional electron guns may be used if desired. For example, four electron guns could be used to paint four horizontal lines simultaneously. It will be appreciated that there will be increased difficulties in accurately aligning the electron beams when more electron guns are provided, but this may be balanced by the fact that adequate display brightness may be maintained.

Figure 5:
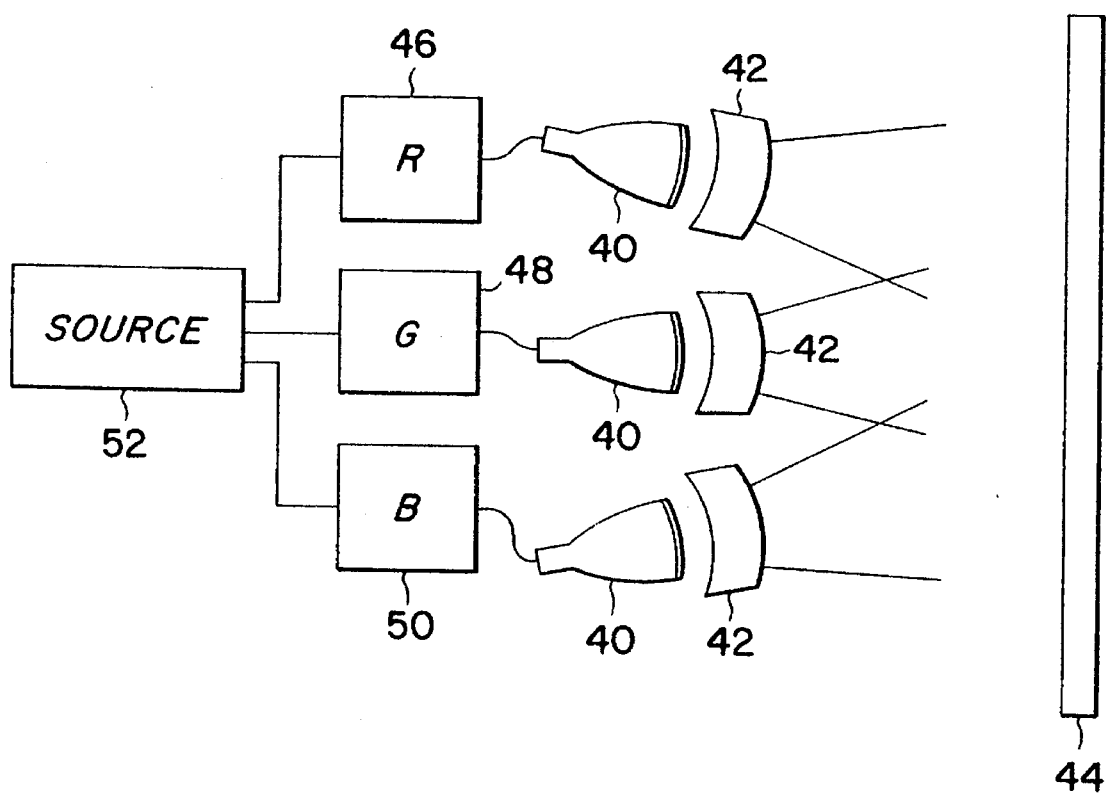
FIG. 5 is a high level block diagram illustrating a projection television system.

FIG. 5 illustrates the use of the cathode ray tube of the present invention in a projection television system. Three cathode ray tubes 40 are provided. As known in the art, each of these cathode ray tubes corresponds to the display information for a single color, red, green or blue, so that the cathode ray tubes themselves 40 are monochrome displays. In this case, each of the electron guns 26, 28 will emit only a single electron sub-beam, instead of three electron sub-beams one each for the colors red, green and blue, used for the color cathode ray tubes.

Optical systems 42 corresponding to each of the cathode ray tubes 40 are used to project the red, green and blue beams onto a screen 44. Each cathode ray tube 40 is driven by an appropriate video driver 46, 48, 50. A red driver 46, green driver 48, and blue driver 50 are provided. A video signal source 52 provides the separate red, green and blue signals to the red driver 46, green driver 48, and blue driver 50, respectively. The red driver 46, green driver 48, and blue driver 50, use the red signal, blue signal and green signal, respectively, to drive a respective one of the three cathode ray tubes 40 in the manner described above. Preferably, the video signal source provides two channels of information, so that the two electron guns in each cathode ray tube 40 can be driven independently by a respective red driver 46, green driver 48, and blue driver 50. However, a particular embodiment may provide for delay by the red driver 46, green driver 48, and blue driver 50 of the odd numbered scan rows, as described above.

As described above, two channels of information may be developed by simply delaying the odd numbered scan rows using an electronic delay line. Alternatively, an encoding scheme could be used wherein both channels were simultaneously made available to the video decoding circuits used to generate the signal sent to the drivers 46, 48, 50. If only a single signal is available in the original video signal source, both channels, and, by definition, both electron guns within a given cathode ray tube can be driven using the same signal as described above.

The cathode ray tube of the present invention may also be embodied using a split-beam electron gun. The split-beam electron gun enables one electron gun to be used in lieu of two or more electron guns.

As depicted in FIG. 6, the cathode ray tube includes an electron gun 60 for emitting a stream of electrons. As shown in FIG. 6, the stream of electrons is channeled through two control grid apertures 61 to effectively create two electron beams 67, 68 from the single electron gun 60. A ceramic insulator 62 bounds the control grid apertures 61. The control grid apertures 61 are plated with a conductive material overlying the ceramic insulator 62, with the conductive material terminating at signal terminals 63, 64. The electron beams 67, 68 pass through a first anode 65 and/or a second anode 66, as is well known in the art. More than two control grid apertures may be placed in the ceramic insulator to create a respective number of electron beams generated by the same electron gun. Persons skilled in the art would know that various implementations and variations of this split-beam electron gun architecture may be effectively employed.

It will be appreciated by those skilled in the art that many specific implementations can make use of the principles described above. It is well known that a large number of different cathode ray tube designs are possible and useful. The general approach of providing two or more electron guns, and scanning these electron guns simultaneously to provide two or more channels, or horizontal lines, of information simultaneously may be easily adapted to most, if not all, of these designs.

It is also possible to scan the independent electron beams in a manner different from that described in connection with the preferred embodiment. For example, one electron beam could be used entirely for the upper half of the screen with the other electron beam being used for the lower of the screen. However, this complicates the vertical deflection circuitry somewhat, and also makes the provision of two separate signals more difficult. It is possible that the use of multiple parallel scan lines which are physically adjacent on the screen will provide the best results.

While the invention has been particularly shown and described with reference to a preferred embodiment, it will be understood by those skilled in the art that various changes in form and detail may be made therein without departing from the spirit and scope of the invention.

What is claimed is:

1. A cathode ray tube, comprising:

a phosphor screen displaying visual images;

at least two electron guns for generating electron beams, with each gun generating multiple electron beams suitable for generating color images on said phosphor screen; and control means for directing the multiple electron beams against said phosphor screen for displaying images corresponding to information contained in the beams, with the multiple electron beams separated in a selected direction for generating multiple lines of image information on said phosphor screen, and with said control means including means for converging the multiple electron beams substantially parallel prior to directing the multiple electron beams against said phosphor screen.

2. The cathode ray tube as set forth in claim 1, wherein said control means causes the beams to be directed against said phosphor screen so as to produce a raster scan thereon.

3. The cathode ray tube of claim 2, wherein the selected direction is at right angles from the direction of the raster scan.

4. The cathode ray tube as set forth in claim 1, wherein said at least two electron guns comprises two electron guns.

5. The cathode ray tube of claim 1, wherein each gun generates multiple beams suitable for generating RGB images on said phosphor screen.

6. The cathode ray tube as set forth in claim 1, wherein said means for converging includes a member for providing an electrostatic field.

7. The cathode ray tube as set forth in claim 1, further comprising means for sweeping the multiple electron beams across said phosphor screen to provide a raster scanned image thereon.

8. The cathode ray tube as set forth a claim 1, with each of the multiple electron beams separately modulated to contain information.

9. A cathode ray tube comprising:

a phosphor screen for displaying visual images;

at least two electron guns for generating electron beams, with each gun generating multiple beams suitable for generating color images on said phosphor screen;

alignment means for aligning the electron beams substantially parallel and separated in a selected direction for generating multiple lines of image information on said phosphor screen; and deflection means for directing the aligned electron beam against said phosphor screen for displaying images corresponding to information contained in the electron beams.

10. The cathode ray tube as set forth in claim 9, with each of the electron beams separately modulated to contain information.

11. The cathode ray tube as set forth in claim 9, with said deflection means causing the electron beams to be directed against said phosphor screen so as to produce a raster scan thereon.

12. The cathode ray tube of claim 11, wherein the selected direction is at right angles from the direction of the raster scan.

13. The cathode ray tube of claim 9, wherein each gun generates multiple beams suitable for generating RGB images on said phosphor screen.

14. The cathode ray tube as set forth in claim 9, wherein said alignment means includes at least one member for providing an electrostatic field.

15. The cathode ray tube of claim 14, wherein said alignment means comprises two anodes.

16. A method for generating a visually perceptible image on a phosphor screen, comprising the steps of:

generating two electron beams, each electron beam containing image information, with each of the electron beams having a plurality of sub-beams for generating a color image on the phosphor screen;

aligning the two electron beams substantially parallel and separated in a selected direction by a distance sufficient for generating two lines of image information on said phosphor screen; and directing the aligned electron beams against said phosphor screen for displaying images corresponding to the image information contained in the electron beams.

17. The method of claim 16, wherein the beams generate an RGB image.

18. The method as set forth in claim 16, wherein said directing step includes the steps of repeatedly scanning the beams across the phosphor screen to create a raster image.

19. The method as set forth in claim 16, with said two electron beams separated by one scan line distance.

20. The method as set forth in claim 16 with the step of generating two electron beams further comprising the steps of:

generating a stream of electrons with an electron gun;

emitting the stream of electrons toward the phosphor screen;

blocking, with a ceramic insulator located between the electron gun and the phosphor screen, the stream of electrons; and channeling a first electron beam through a first control grid aperture in the ceramic insulator, and channeling a second electron beam through a second control grid aperture in the ceramic insulator, each of said first and second electron beams including a subset of electrons comprising the stream of electrons.

21. The method as set forth in claim 20 with the step of directing including use of a first anode.

22. The method as set forth in claim 21 further comprising, after the step of directing, the step of adjusting a direction of said aligned electron beams toward the phosphor screen using a second anode.

23. The method as set forth in claim 20 with the step of directing comprising the steps of repeatedly scanning said first and second electron beams across the phosphor screen to create a raster image.

* * * * *